May 6, 1941.                J. H. FRIEDMAN                2,241,242
                              AIR COOLED CLUTCH
                    Filed Dec. 5, 1938          2 Sheets-Sheet 1

INVENTOR.
John H. Friedman.
BY Richey + Watts
ATTORNEYS

May 6, 1941.     J. H. FRIEDMAN     2,241,242
AIR COOLED CLUTCH
Filed Dec. 5, 1938     2 Sheets-Sheet 2

INVENTOR.
JOHN H. Friedman.
BY Richey + Watts
ATTORNEYS.

Patented May 6, 1941

2,241,242

UNITED STATES PATENT OFFICE 2,241,242

AIR COOLED CLUTCH

John H. Friedman, Tiffin, Ohio, assignor to The National Machinery Company, Tiffin, Ohio, a corporation of Ohio Application December 5, 1938, Serial No. 243,940

12 Claims. (Cl. 192—113)

This invention relates to clutches and more particularly to an improved construction of a combined driving wheel and heavy duty friction clutch. The present invention is an improvement over that disclosed and claimed in the copending application of William L. Clouse, Serial No. 241,224, filed November 18, 1938.

Many difficulties have been encountered in attempting to use friction clutches to couple the driving and driven elements of heavy duty intermittently operated machinery such as forging machines, forging presses, shears and the like, these difficulties being due largely to the heat developed when the machine is operated steadily with repeated engagements of the clutch. In heavy duty machinery of this type it is customary to use a flywheel which is continuously rotated by a motor and to couple the flywheel to the driven member of the machine during the desired cycle of operation, at the conclusion of which the clutch is released and the machine brought to rest preparatory for the next operation. In machinery having parts of considerable inertia which must be started from rest and brought up to speed, considerable heat is developed in a friction clutch during the interval after the clutch is engaged and before the driven parts have been brought up to speed, while the friction surfaces are slipping relative to each other. This heat not only has a detrimental effect directly upon the friction linings or other friction surfaces employed in the clutch, but also when the clutch is attempted to be combined with the flywheel or other driving wheel causes a thinning of the lubricant used in the wheel bearings so that the lubricant is permitted to escape from the bearings and work into the friction surfaces, destroying or greatly impairing the effectiveness of the clutch.

The principal object of this invention is to effectively force a large volume of air through cooling and ventilating passages in a friction clutch. A further object is to cool by forced draft the bearing portions and the friction elements of the clutch without permitting a deposit of foreign matter on the friction surfaces. Other objects and advantages of this invention will appear in the following detailed description of the preferred embodiment of this invention.

Figure 1:
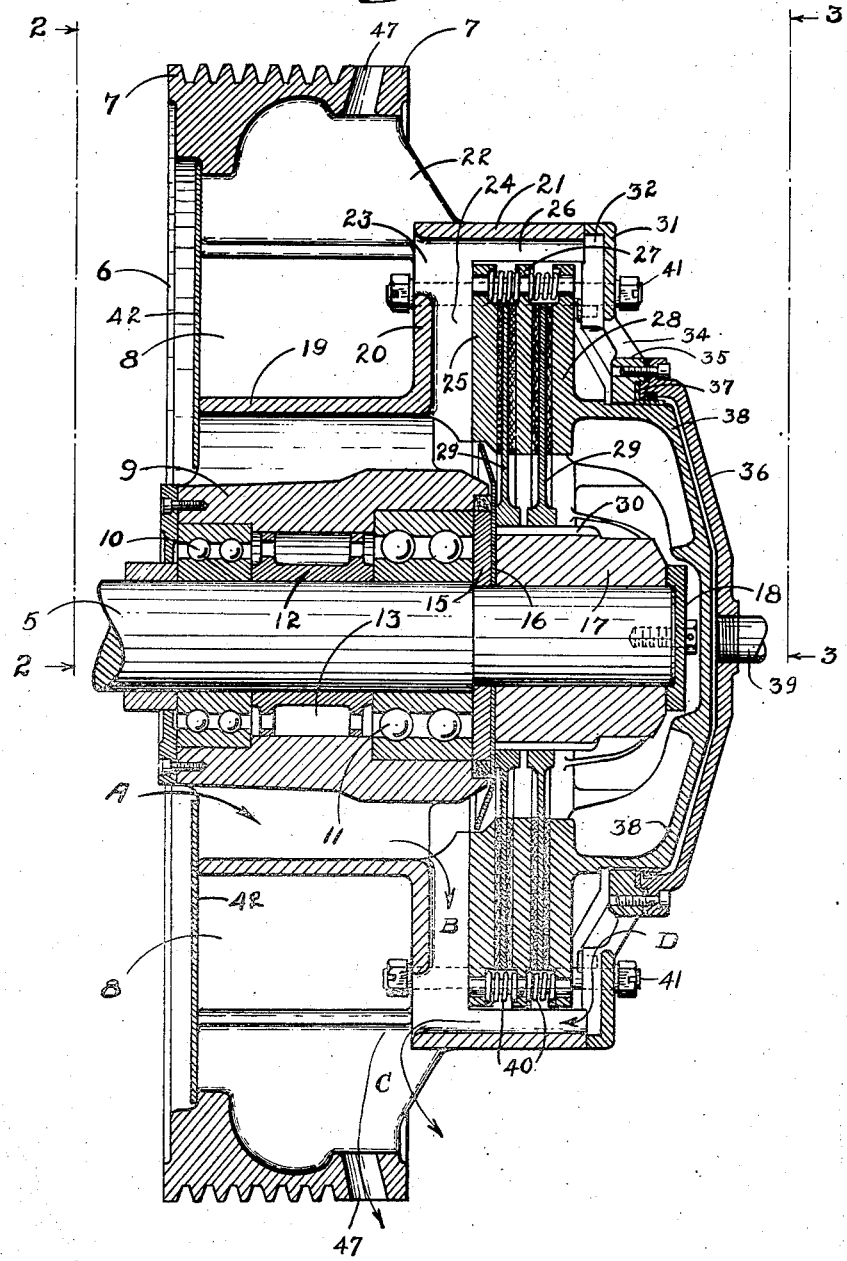
Figure 1 is a vertical section through a combined flywheel and clutch embodying the present invention.
Figure 2:
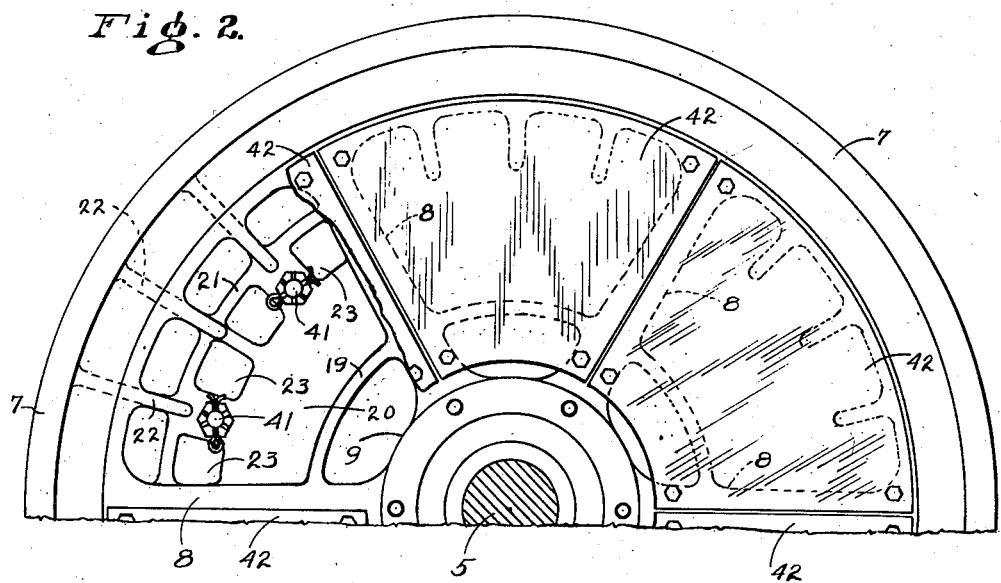
Figure 2 is a partial rear elevation of the structure shown in Figure 1, one of the cover plates being broken away to expose the interior construction.
Figure 3:
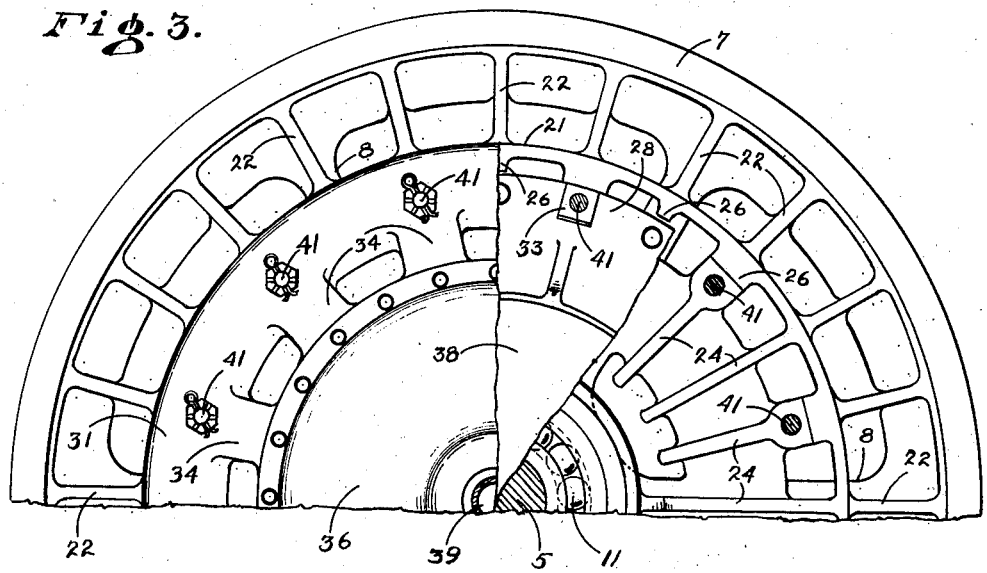
Figure 3 is a partial front elevation of the structure shown in Figure 1, the outer cylinder cover plate being broken away to expose the piston and pressure plate, and the piston, pressure plate and friction plates in turn being broken away to expose the flywheel casting.

Referring to the drawings, the invention is illustrated in a form particularly adapted to be mounted upon the driven shaft 5 of a forging machine, press or the like. It will be understood by those skilled in the art that the shaft 5 projects laterally from the bed frame or other suitable supporting structure in the machine and is connected in any desired way with the operating parts of the machine. Rotatably mounted upon the shaft 5 is a flywheel 6 which, in the embodiment shown, consists of a relatively heavy rim 7 supported by a plurality of spokes 8 from a hub member 9 which bears upon the shaft through two sets of axially spaced ball bearings 10 and 11. In the embodiment shown the rim is formed to receive a belt to drive the wheel, but it will be understood that the rim might also be formed as a gear to receive the driving force. A spacer 12 is arranged on the shaft between the two sets of bearings 10 and 11 and is provided with a groove 13 opening to both sets of ball bearings which is adapted to receive and hold a quantity of grease to lubricate the bearings. The shaft 5 projects past the roller bearings 11 and carries a bearing retainer 15, a baffle plate 16, a sleeve 17 keyed to the shaft, and a retaining cap 18 bolted to the end of the shaft.

The spokes 8 extend radially between the hub 9 and the rim 7 and also extend axially substantially the full axial length of these members, thereby dividing the space between the hub 9 and the rim 7 into a plurality of separate compartments. Arcuate webs 19 concentric with and spaced radially from the hub 9 are integrally formed between each two adjacent spokes 8. At their forward edges the webs 19 are integral with an annular plate or thrust wall 20 extending radially outward from the webs 19 and terminating at the rear edge of a substantially cylindrical flange 21. A plurality of relatively short radially extending webs 22 are integrally formed on the inner surface of the rim 7 of the flywheel between each two adjacent spokes and are integrally joined with the rear surface of the radially extending plate 20 and with the cylindrical flange 21. A series of holes 23 are formed through the plate 20 radially inward from the flange 21, one hole 23 being located between each two adjacent webs 22.

The forward face of the plate 20 is provided with spaced radially extending ribs 24 against which a clutch plate 25 is seated. The spaces defined by the ribs 24, the plate 20, and the clutch plate 25 are open at their inner ends to the forward ends of the axially extending passages between the hub 9 and the webs 19, and are open at their outer ends through the holes 23 to the spaces between the spokes 8 and webs 22. The inner surface of the cylindrical flange 21 is likewise provided with spaced ribs 26 extending radially inward a short distance and the radially inward sides of which define a cylindrical space within which the clutch plates are located. The clutch plate 25, a central clutch plate 27 and an outer pressure plate 28 are arranged to fit within the cylindrical space defined by the ribs 26, the rear plate 25 bearing against the ribs 24 as previously explained.

A pair of clutch discs 29 are slidably mounted upon the sleeve 17 keyed to the shaft and are held against rotation with respect to the sleeve 17 by splines or the like 30. Suitable friction material is secured to both faces of the plate 27 and to the adjacent faces of the plates 25 and 28, the clutch discs 29 being arranged between the adjacent friction lined surfaces of the plates 25, 27 and 28. A ring 31 is arranged to close the radially outer portion of the cylindrical space defined by the ribs 26 within which the friction members are positioned and is provided with ribs 32 arranged to abut the ends of ribs 26 so as to maintain the ring 31 spaced from the outer pressure plate 28.

The clutch plates 25, 27 and 28 are secured to the clutch housing formed by the plates 20, cylindrical flange 21 and ring 31 in any suitable way so as to be held against rotation with respect to the housing, but axially slidable therein. As shown, a plurality of bolts 41 extend through certain of the webs 24 and through the ring 31, these bolts being spaced radially inward from the webs 26 and carrying squared spacer blocks 33 fitting within aligned recesses in the plates 25, 27 and 28. The bolts thereby secure the ring 31 to the flywheel structure and lock the clutch plates against rotation with respect thereto, while permitting axial sliding of the plates. The ring 31 preferably interfits with the flange 21 so that the ring is locked against rotation.

The ring 31 is formed with a plurality of short spokes 34 extending radially inward therefrom and integrally joined to an annulus 35. A cover plate or cylinder head 36 is bolted to the annulus 35, suitable packing 37 being interposed between these members. A piston 38 is integrally formed with the pressure plate 28 and slidably fits within the annulus 35 and the packing 37. A suitable connection 39 is provided to admit pressure fluid to the space between the cylinder head 36 and the piston 38 to force the piston and its integral pressure plate 28 axially away from the cylinder head 36 and thereby clamp the clutch discs 29 between the three clutch plates 25, 27 and 28. Suitable springs such as those shown at 40 are preferably provided between the clutch plates 25, 27 and 28 to insure the uniform separation of these plates upon release of the pressure fluid.

Sector shaped cover plates 42 are secured to the rear face of the flywheel, each plate spanning the space between two adjacent spokes 8 and extending radially inward from the rim 7 past the webs 19 and terminating at a point spaced a short distance outwardly from the hub 9.

In operation the flywheel 6 is ordinarily continuously rotated by a motor in any convenient manner, the shaft 5 being normally stationary and the flywheel rotating upon the spaced bearings 10 and 11. All of the parts illustrated except the shaft 5, the sleeve 17 and the two clutch discs 29 splined to the sleeve 17 rotate with the flywheel. When pressure fluid is admitted through the pipe 39 to the space between the cylinder head 36 and the piston 38, the piston 38 and the pressure plate 28 are forced axially inward toward the thrust wall 20, gripping the clutch discs 29 between the friction surfaces on plates 25, 27 and 28, and thereby causing the shaft 5 to rotate with the flywheel. In the normal operation of intermittently operated machinery the clutch remains engaged for one cycle and is then disengaged, the machine and shaft 5 being stopped by a suitable brake or the like, the flywheel and associated parts continuing to rotate. This operation is repeated for each desired cycle or operation of the machine, and in heavy machinery considerable heat is developed by the interengaging clutch discs and clutch plates during the period of slippage while the clutch is engaging and disengaging.

The spokes 8 provide radially extending separated compartments which are open to the atmosphere through the space between the webs 22 at the front face of the flywheel and through the holes 47 extending radially inward from the outer surface of the rim 7 and between the webs 22. These webs 22 and the spokes 8, therefore, form a centrifugal blower within the flywheel exhausting through the holes 47 and the spaces between the webs 22 and thereby reducing the pressure within the compartments between the spokes 8 and outside the arcuate webs 19.

The spaces between the arcuate webs 19 and the hub 9 are open to the atmosphere on the rear side of the flywheel below the lower edges of the cover plates 42, and open at their forward ends into the radial spaces between the ribs 24, the thrust plate 20, and the rear clutch plate 25. These latter radially extending spaces in turn open into the spaces between the spokes 8 through the holes 23. The reduced pressure created between the spokes 8 by rotation of the flywheel causes air to be drawn into the spaces between the hub 9 and the webs 19 as indicated by the arrow A in Figure 1 and this air is then drawn radially outwardly between the ribs 24 on the outer faces of the plates 20 as indicated by the arrow B, then into the spaces between the spokes 8 through the holes 23, and then outwardly through the holes 47 and the spaces between the webs 22 as indicated by the arrows C. At the same time atmospheric air is caused to flow in through the openings between the spokes 34 on the front face of the clutch assembly as indicated by the arrow D, this air passing between the ribs 32 and the ribs 26 and thence outwardly as indicated by the arrows C. The baffle plate 16 prevents air entering the compartments between the hub 9 and the arcuate webs 19 from passing between the friction surfaces on the clutch discs and plates so that this air is compelled to move radially outward between the webs 24, and between the plates 20 and the clutch plate 25. Air entering between the spokes 34 on the front face of the clutch assembly is prevented from reaching the spaces between the clutch plates and discs by the solid wall of the piston 36 which is integrally joined with the pressure plate 28 so that the air entering these openings must move radially outward between the ribs 32 and thence through the spaces between the ribs 26 to the interior of the flywheel.

The speed of rotation of the flywheel and the relatively large radial extent of the spokes 8 makes the flywheel a highly efficient blower so that a large quantity of air is continuously pumped through the spaces between the hub 9 and the arcuate webs 19, thereby moving directly over the full length of the hub 9 and preventing any excessive heating of the bearings or the grease contained in the space 13. At the same time a large quantity of air is pumped through the spaces between the webs 24 and therefore directly along the rear face of the clutch plate 25 so as to effectively absorb heat from this clutch plate. Likewise a substantial quantity of air moves through the spaces between the spokes 34 and along the forward face of the pressure plate 28 and thence past the edges of the clutch plates 25, 27 and 28, greatly assisting in dissipating the heat from the clutch plates and thereby preventing deterioration of the friction surfaces on the clutch plates from heat. Any desired proportion between the amount of air pumped through the axial passages between the hub 9 and the webs 19, and the amount drawn in through the spaces between the spokes 34 and past the outer edges of the clutch plates may be maintained by adjustment of the size of the opening to atmosphere between the hub 9 and the inner edges of the cover plates 42.

The invention has been described and illustrated as applied to the type of clutch disclosed and claimed in the aforesaid application of Clouse, Serial No. 241,224, filed November 18, 1938, but it may also be applied to many other types of clutches. While the preferred embodiment of the invention has been described in considerable detail, it will be understood that many variations and modifications may be resorted to without departing from the scope of the invention as defined in the following claims.

I claim:

1. In combination with a driven shaft, a flywheel having a hub rotatably mounted on said shaft on axially spaced bearings and a rim carried from said hub by spaced spokes, walls disposed transversely to the axis of said shaft and on opposite sides of said spokes interengaging friction clutch members carried by said flywheel and said shaft respectively, means to engage said friction clutch members to couple said shaft to said flywheel, said flywheel being formed with spaces between said spokes and between said walls opening to atmosphere adjacent the outer periphery thereof and at points adjacent said hub, and axially extending webs spaced radially outward from said last mentioned openings forming axially extending air passages surrounding said hub constituting part of said spaces.

2. In combination, a driven shaft, a wheel having a hub portion bearing on said shaft, interengaging friction clutch elements carried by said wheel and said shaft, said wheel having separated compartments open to atmosphere adjacent the periphery of said wheel and closed to atmosphere at their radially inner portions, whereby rotation of said wheel tends to reduce the pressure in said compartments, and means defining air passages adjacent said clutch elements opening into said compartments and opening to atmosphere.

3. A clutch comprising a wheel having hub and rim portions and a housing intermediate said hub and rim portions, interengaging friction clutch elements arranged within said housing, certain of said elements being connected with said housing for rotation with the wheel, said wheel being formed with separated compartments extending radially outward past said housing and open to atmosphere adjacent the periphery of said wheel and closed to atmosphere at their radially inner portions whereby rotation of said wheel tends to reduce the air pressure in said compartments, said housing being formed with air passages adjacent said clutch elements opening to atmosphere and opening into said compartments whereby rotation of said wheel causes a circulation of cooling air through said passages.

4. A clutch comprising a wheel having hub and rim portions and a housing portion intermediate said hub and rim portions, interengaging friction clutch elements arranged within said housing, certain of said elements being connected to said housing for rotation with said wheel, said wheel having radial webs extending inwardly from said rim portion forming separated compartments, means closing one side of said compartments throughout their radial extent, at least certain compartments being open to atmosphere adjacent the periphery of said wheel and said wheel being formed with cooling air passages open to atmosphere and opening into said compartments.

5. A clutch comprising a wheel having hub and rim portions and spokes extending radially between said hub and rim portions, friction clutch elements carried by said wheel and arranged to engage co-operating friction clutch elements carried by a driven shaft, means closing the spaces between said spokes to atmosphere on one side of the wheel throughout the radial extent of said spaces, said spaces being open to atmosphere radially outside of said friction clutch elements and said wheel being formed with cooling air passages opening to atmosphere within the radial extent of said friction clutch elements and opening into the spaces between said spokes.

6. In combination, a driven shaft, a wheel having a hub portion bearing on said shaft, and a rim portion, interengaging friction clutch discs carried by said wheel and said shaft, means carried by said wheel for exerting an axial pressure on said friction clutch discs to couple said wheel and shaft, said wheel being formed with a radially disposed thrust wall to receive the thrust of said means, said wheel having radially disposed webs extending inwardly from said rim forming separated compartments, means closing said compartments to atmosphere at their inner portions and said compartments being open to atmosphere adjacent said rim, said wheel being formed with air passages for the circulation of air past said friction clutch elements open to atmosphere and opening into said compartments through said thrust wall.

7. In combination, a driven shaft, a wheel having a hub portion bearing on said shaft, interengaging friction clutch elements carried by said wheel and said shaft, said wheel being formed with separated compartments, open to atmosphere adjacent the periphery of said wheel and closed to atmosphere at their radially inner portions, said hub portion being formed with air passages opening to atmosphere at one end and opening into passages communicating with said compartments at their other ends.

8. In combination, a driven shaft, a wheel having a hub portion bearing on said shaft, interengaging friction clutch elements carried by said wheel and said shaft, said wheel having radially disposed spokes forming separated compartments open to atmosphere adjacent the periphery of said wheel, means closing the spaces between said spokes on one side of said wheel and the radially inward portions of said spaces on the other side of said wheel, said hub portion being formed with air passages open to atmosphere at one end communicating with said separated compartments.

9. A clutch comprising a wheel having hub and rim portions, and a substantially cylindrical flange co-axial with said wheel and positioned between said hub and rim portions, said wheel being formed with a thrust wall extending radially inward from one end of said flange, interengaging friction clutch discs positioned within said flange, certain of said discs being keyed to said flange for rotation with said wheel, said wheel having webs extending inwardly from said rim forming separated compartments open to atmosphere adjacent said rim, and said flange being formed with air passages open to atmosphere and extending past the edges of said friction clutch discs and opening into said separated compartments through said thrust wall.

10. In combination, a driven shaft, a wheel having a hub portion bearing on said shaft, said wheel being formed with a rim portion and a substantially cylindrical flange co-axial with and disposed between said hub and rim portions, a thrust wall extending radially inward from one end of said flange, interengaging friction clutch discs keyed to said flange and said shaft, said wheel having webs extending inwardly from said rim forming separated compartments open to atmosphere adjacent said rim and said flange being formed with air passages open to atmosphere and extending past the edges of said clutch discs and opening through said thrust wall into said separated compartments.

11. A clutch comprising a wheel having hub and rim portions, and a substantially cylindrical flange co-axial with said wheel and positioned between said hub and rim portions, said wheel being formed with a thrust wall extending radially inward from one end of said flange, interengaging friction clutch discs positioned within said flange, certain of said discs being keyed to said flange for rotation with said wheel, said wheel having webs extending inwardly from said rim forming separated compartments open to atmosphere adjacent said rim, means closing said separated compartments to atmosphere on one side of the wheel, and said flange being formed with air passages open to atmosphere and extending past the edges of said friction clutch discs and opening into said separated compartments through said thrust wall.

12. In combination, a driven shaft, a wheel having a hub portion bearing on said shaft, said wheel being formed with a rim portion and a substantially cylindrical flange co-axial with and disposed between said hub and rim portions, a thrust wall extending radially inward from one end of said flange, interengaging friction clutch discs keyed to said flange and said shaft, said wheel having webs extending inwardly from said rim forming separated compartments open to atmosphere adjacent said rim, means closing said separated compartments to atmosphere on one side of the wheel, and said flange being formed with air passages open to atmosphere and extending past the edges of said clutch discs and opening through said thrust wall into said separated compartments.

JOHN H. FRIEDMAN.